United States Patent
Fan et al.

(10) Patent No.: US 8,130,697 B1
(45) Date of Patent: Mar. 6, 2012

(54) AUTONOMOUS MOBILE ELECTRONIC MAIL SYSTEM

(75) Inventors: Rodric C. Fan, Fremont, CA (US); Edward David Mleczko, San Jose, CA (US); Sean Dominic Taylor, Fremont, CA (US)

(73) Assignee: Genx Mobile, Inc., San Jose, CA (US)

( * ) Notice: Subject to any disclaimer, the term of this patent is extended or adjusted under 35 U.S.C. 154(b) by 906 days.

(21) Appl. No.: 10/771,605

(22) Filed: Feb. 3, 2004

(51) Int. Cl.
*H04W 4/00* (2009.01)
*H04M 1/725* (2006.01)

(52) U.S. Cl. .................................. 370/328; 455/412.1

(58) Field of Classification Search .................. 370/328, 370/357.09, 357.1, 338, 357, 253, 349, 389, 370/471; 455/456.1, 456.2, 456.3, 412.1, 455/414.2, 466, 412.2
See application file for complete search history.

(56) References Cited

U.S. PATENT DOCUMENTS

| | | | |
|---|---|---|---|
| 5,794,140 A * | 8/1998 | Sawyer | 455/408 |
| 5,959,577 A | 9/1999 | Fan et al. | |
| 5,990,827 A | 11/1999 | Fan et al. | |
| 5,999,892 A | 12/1999 | Fan | |
| 6,219,694 B1 | 4/2001 | Lazaridis et al. | |
| 6,459,988 B1 | 10/2002 | Fan et al. | |
| 6,529,159 B1 | 3/2003 | Fan et al. | |
| 6,552,682 B1 | 4/2003 | Fan | |
| 6,594,576 B2 | 7/2003 | Fan et al. | |
| 6,847,892 B2 * | 1/2005 | Zhou et al. | 701/213 |
| 7,200,409 B1 * | 4/2007 | Ichikawa et al. | 455/456.1 |
| 7,366,522 B2 * | 4/2008 | Thomas | 455/456.1 |

* cited by examiner

*Primary Examiner* — Eugene Yun
(74) *Attorney, Agent, or Firm* — Innovation Counsel LLP

(57) ABSTRACT

The invention is a system, a device, and a method that allows remote mobile unit monitoring. The communication system of the invention includes a plurality of mobile units monitored by a stationary unit. Each of the mobile units has a processor, a memory, and a wireless modem for automatically generating a status report and transmitting the status report in an e-mail format without user intervention. The processor of the mobile unit determines when and whether to send a status report by determining if a predefined condition is fulfilled. The stationary unit, which is primarily a user interface unit, parses the status report in the received e-mail and presents the report to the user. Most of the processing and storage capabilities of the system reside in the individual mobile units.

34 Claims, 8 Drawing Sheets

| Mobile Unit A | | | | | |
|---|---|---|---|---|---|
| Position | Time | Avg. speed | Acceleration | Temperature | Air bag status |
| ... | ... | ... | ... | ... | ... |

FIG. 8

| Mobile Unit A | | | | | |
|---|---|---|---|---|---|
| Position | Time | Avg. speed | Acceleration | Temperature | Air bag status |
| | | | | | |

| Mobile Unit B | | | | | |
|---|---|---|---|---|---|
| Position | Time | Avg. speed | Acceleration | Temperature | Air bag status |
| | | | | | |

FIG. 9

AUTONOMOUS MOBILE ELECTRONIC MAIL SYSTEM

FIELD OF INVENTION

The invention relates generally to a system and method for mobile communication and more specifically to an electronic mail system.

BACKGROUND

Increasingly, industries rely on a fleet of dispatched mobile units to provide services or deliver products. For example, general contractors, utility providers, cable companies, appliance service providers, truck rental companies, taxi companies, airlines, police/fire departments, and various delivery services all utilize mobile units (e.g., vans, trucks, automobiles, airplanes) as part of their respective operations. When an operation involves numerous mobile units, it is often desirable, yet difficult, to obtain information about the dispatched mobile units. For example, it is desirable to know if a mobile unit has been involved in an accident or if an employee driver is using the mobile unit in an inappropriate manner.

Locating a mobile unit is especially useful if it can be done from a remote management station, such as where the scheduling is done. This remote locating process usually entails two steps: determination of the position of the mobile unit, and transmission of the positioning data or the position data to the remote management station. One of the methods for determining the location of a mobile unit utilizes the Global Positioning System (GPS). The GPS involves a plurality of satellites orbiting the earth and sending out, at synchronized times, a code sequence that identifies the satellite. Along with this identification information is sent some positioning information that can be processed to determine a position. A GPS receiver receives the code sequence and the positioning information and passes it on to a processor. The processor determines the position of the GPS receiver by using well-known methods such as triangulation.

The position information as determined by the GPS receiver is then transmitted to a server that stores all the information. Typically, this transmission from the GPS receiver to the server is achieved via a combination of wireless communication networks such as CDMA and the Internet. FIG. 1, for example, discloses a centralized system 10 whereby a mobile unit 12 with a GPS receiver 14 transmits the positioning information to a remote server 16 via a CDMA network 18. The server 16 stores all the position information in a database 20 and allows client stations 22 to access the database 20 through the Internet 24. Further details of this system are provided in U.S. Pat. No. 5,959,577.

While the system of U.S. Pat. No. 5,959,577 accomplishes the goal of allowing remote management stations to obtain information about mobile units, it has several drawbacks that make the system unappealing to clients. These drawbacks stem primarily from the fact that the position data for all the mobile units 12 are centrally stored at the server 16. There is an inherent lack of privacy associated with this shared-server system, and the possibility that Client A might accidentally access location information pertaining to Client B's fleet may cause enough discomfort on the part of some clients to stop the client from using the system. Furthermore, consolidation of data for all the mobile units in one database poses a scalability problem as more clients join the system, and results in a high maintenance fee. The increased maintenance fee will inevitably get passed on to the clients. Also, if the database experiences a problem (e.g., it crashes), all the clients whose operations depend on the central database will be affected. Lastly, this centralized data control system prevents clients from being able to manipulate the data and report format freely. Whichever format the server 16 uses for its reports, that is the format that is "pushed out" to all the clients. Thus, a client who subscribes to the system of U.S. Pat. No. 5,959,977 could pay a high monthly charge for a system that might not be convenient to use.

A system and method of providing position information to clients in a more cost effective and convenient manner is desired.

SUMMARY

The invention is a system, a device, and a method that allows remote mobile unit monitoring without the above-mentioned drawbacks. The communication system of the invention includes a mobile unit having a processor, a memory, and a wireless modem for automatically generating a status report once a condition is fulfilled, wherein the status report is encapsulated in an electronic mail format. The communication system further includes a user interface unit receiving the status report and displaying the status report according to a predefined report format, wherein the user interface unit is geographically remote to the mobile unit.

In another aspect, the invention is a mobile communication device that includes a detection component for measuring a physical parameter, a processor connected to the detection component, wherein the processor is for generating a status report incorporating the physical parameter, a memory connected to the processor, wherein the memory is for storing the status report, and a wireless modem connected to the processor, wherein the wireless modem is for transmitting the status report according to a predetermined protocol once the physical parameter fulfills a condition.

In another aspect, the invention is a method of communication, wherein the method includes obtaining data, preparing a status report incorporating the data, and transmitting the status report using one of SMTP, POP, IMAP, MIME, RFC-822, and Instant Messaging (IM) protocols if the data satisfies a predefined condition, without receiving an external command to transmit.

The invention is also a method of reconfiguring a remote unit using an electronic mail protocol. The method entails encapsulating a command in an electronic mail format such that the command is extractable by the remote unit and transmitting the command via an electronic mail protocol.

In yet another aspect, the invention is a method of communication, wherein the method includes means for obtaining physical data and positioning data; means for preparing a status report using the physical data and the positioning data, and means for transmitting the status report in an electronic mail without receiving an external command.

BRIEF DESCRIPTION OF THE DRAWINGS

FIG. 8 depicts an exemplary status report generated by the mobile unit;

FIG. 9 depicts an exemplary multiple mobile unit report generated by the stationary unit.

DETAILED DESCRIPTION OF THE PREFERRED EMBODIMENT(S)

Embodiments of the invention are described herein in the context of vehicle-installed devices and more specifically in the context of fleet management. However, it is to be understood that the embodiments provided herein are just preferred embodiments, and the scope of the invention is not limited to the applications or the embodiments disclosed herein.

Figure 1:
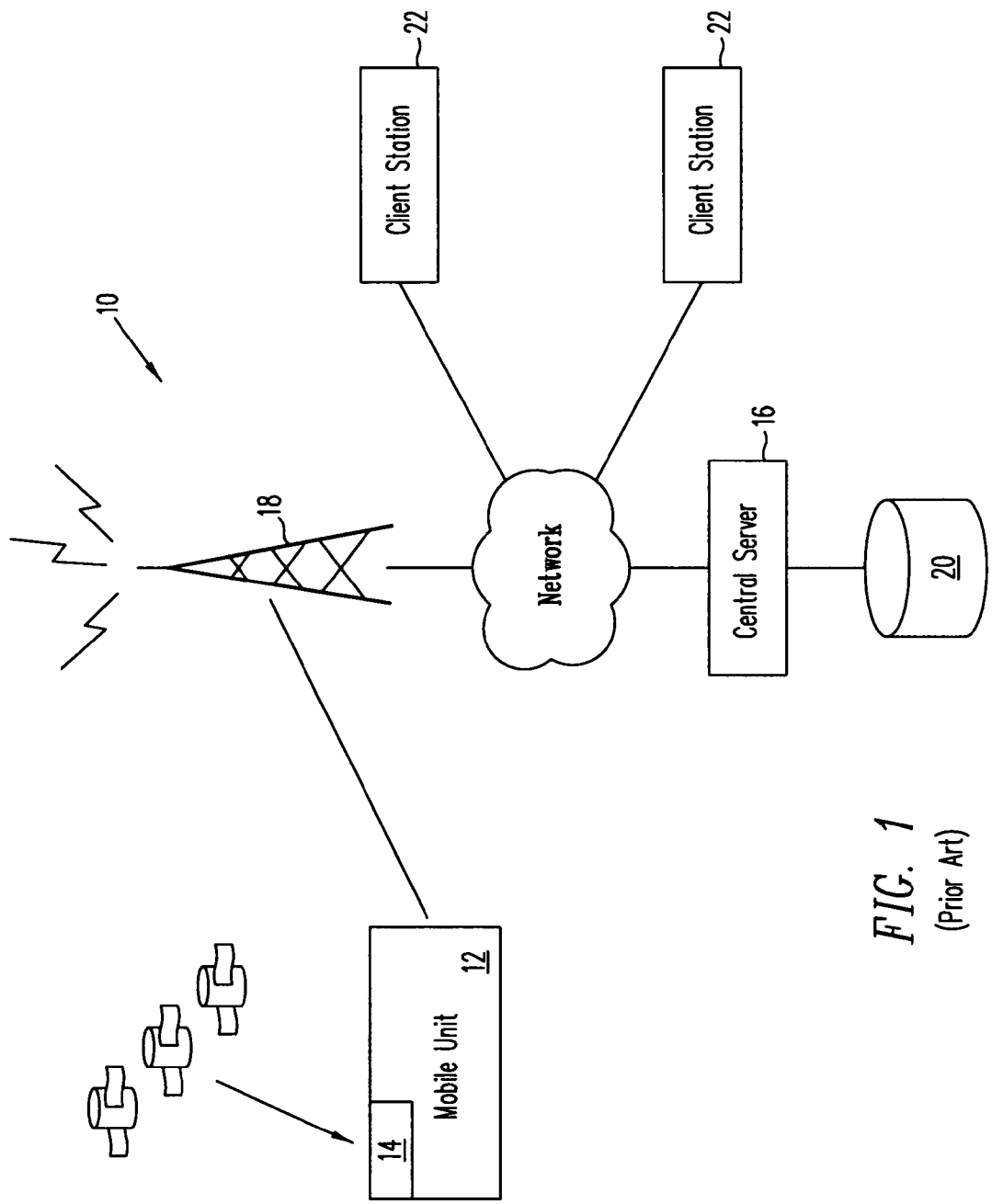
FIG. 1 depicts a centralized system for obtaining information about mobile units.

Unlike in the centralized system 10 of FIG. 1, where most of the storage and processing capabilities of the system reside in the server 16, the storage and processing capabilities of the present invention reside in the individual mobile units. As a result of these capabilities residing in the mobile units, the system of the invention overcomes the above-mentioned drawbacks of the centralized system 10. In the system of the invention, the primary function of the stationary unit is to be an interface between the mobile units and the operator. Thus, the stationary unit receives status reports from the mobile units and displays the reports to the operator in a format that is customized by the operator. The stationary unit of the system is easier to maintain than the server 16 of the centralized system 10 because there is no central database holding all the consolidated information at the stationary unit. Furthermore, even if the stationary unit experiences a problem (e.g., it crashes), there will be no significant effect on the operation of the overall system.

As used herein, "positioning information" is information that may be converted to useful position information with some processing. "Position information," on the other hand, is information that, without further processing, identifies a location. An "e-mail" or an "electronic mail," as used herein, refers to any form of communication using a well-known mail protocol, such as SMTP, POP, IMAP, MIME, RFC-822, IM, etc. The mobile unit 32 of the invention is capable of sending status reports "automatically." An "automatic" e-mail generation refers to creating an e-mail for transmission without receiving a Send command from a user. An "external command," as used herein, is a command that was input from a separate unit (including a person) than the recipient unit.

Figure 2:
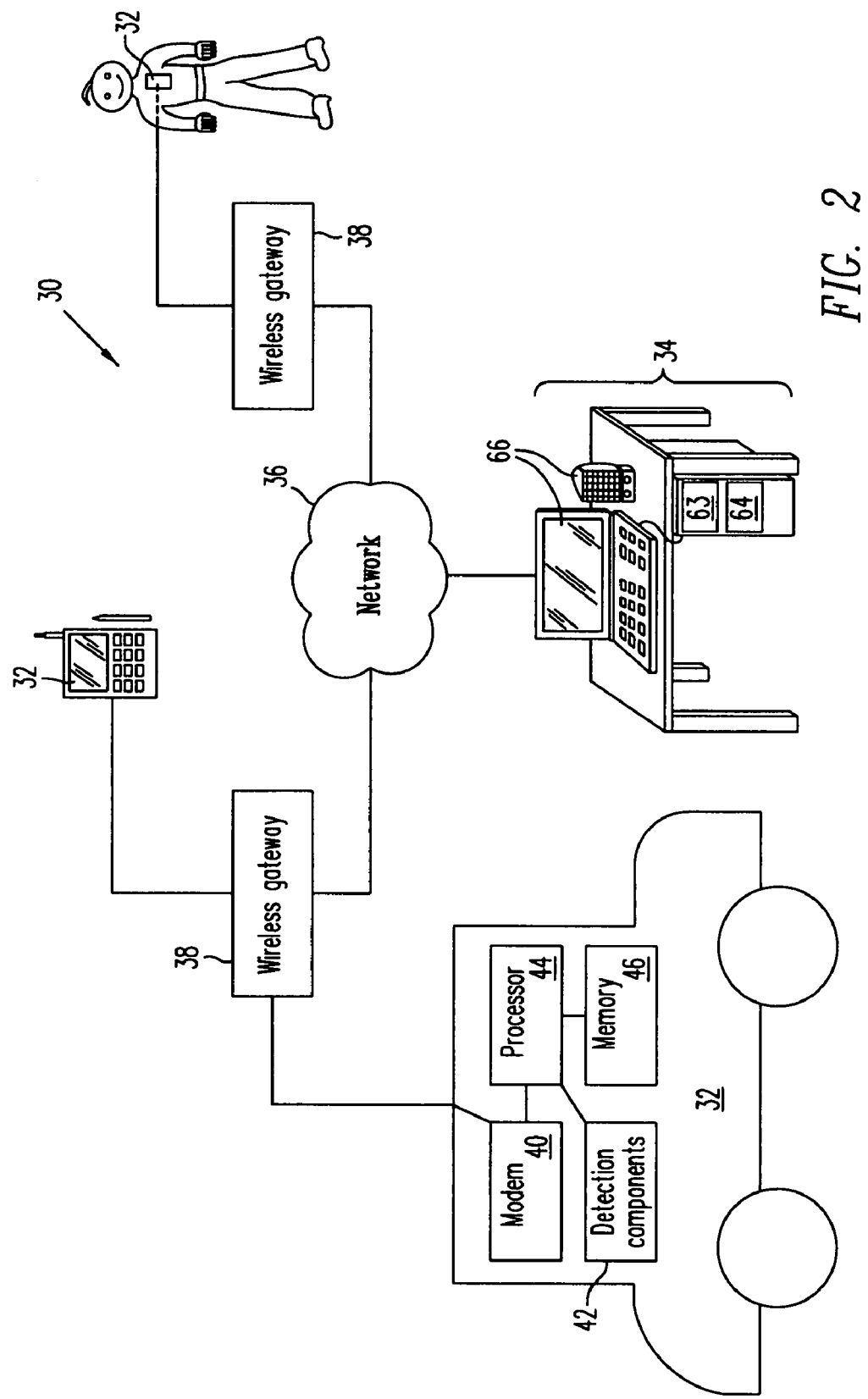
FIG. 2 depicts an automatic messaging system in accordance with the invention.

FIG. 2 is a schematic view of an automatic messaging system 30 in accordance with the invention. The automatic messaging system 30 includes at least one mobile unit 32 that communicates with at least one stationary unit 34. The communication between the mobile unit 32 and the stationary unit 34 entails e-mail exchanges via a network 36 and a wireless gateway 38. The mobile unit 32 automatically generates status reports addressed to the stationary unit 34, as described below. The status report originating at the mobile unit 32 finds its way to the stationary unit 34 via the wireless gateway 38 and the network 36, to which the stationary unit 34 is connected. As shown in FIG. 2, the mobile unit 32 may be implemented as a portable handheld device (e.g., a cellular phone), a wearable device (e.g., a bracelet, a badge), or a device installed in a vehicle.

The mobile unit 32 includes a wireless modem 40 for transmitting status reports and receiving messages through the wireless gateway 38. In addition, the mobile unit 32 includes various detection components 42 that are designed to measure various physical parameters such as speed, air bag status, door status, ambient temperature, etc., a processor 44 that processes the parameters measured by the detection components 42, and a memory 46 for storing the parameters. The detection components 42 include various probes, sensors, and thermometers connected to different parts of the vehicle, such as the speedometer, the rods, the latch at the door, etc. A person of ordinary skill in the art will know which probes/sensors to use and how to connect the probes/sensors to the processor 44 to implement the detection components 42. The detection components 42 take measurements periodically, in response to a signal from the processor 44.

The mobile unit 32 generates a status report, transmits a status report, or takes some other predefined action when a condition is fulfilled. In a first embodiment, the condition is the passage of a certain amount of time ($\Delta t$) since the last status report generation. In this embodiment, if the mobile unit 32 is programmed to transmit a status report at a regular time interval, the stationary unit 34 will receive a status report from the mobile unit 32 at a regular time interval (e.g., every three minutes). If, on the other hand, the mobile unit 32 is programmed to generate a status report every $\Delta t$ but not transmit the status report unless a second condition is fulfilled, the mobile unit 32 will store the generated status report in memory 46.

In a second embodiment, the condition is the mobile unit 32 having traveled a predetermined minimum distance ($\Delta d$) since the last status report generation. In this embodiment, the mobile unit 32 regularly generates status reports and check what the travel distance is since the last status report, so it can transmit the status report when the distance of $\Delta d$ has been traveled.

In a third embodiment, the condition is a measured physical parameter having a certain relationship to a reference value. For example, the physical parameter may be "speed" and the reference value may be ">80 mph." In this example, the processor 44 is programmed to generate or send a status report upon receiving a signal from a detection component 42 indicating that the speed of the mobile unit 32 exceeds e.g., 80 mph. The reference value may be stored in the memory 46. The detection component 42 may sample the speed at a regular time interval but generate a status report only when the condition is fulfilled. Alternatively, the detection component 42 samples the speed at a regular time interval and the processor 44 generates a status report each time a sample is taken. When the sampled speed exceeds the reference value, the sampling frequency may be automatically increased and status reports are generated more frequently. The generated status reports may remain stored in the memory 46 without being transmitted until another condition is fulfilled, such as if the high speed lasts for more than 10 consecutive samplings. In yet another embodiment, the processor 44 transmits every status report that is generated but adds a special alert signal to the status report if a condition is fulfilled, such as if the detection component 42 that detects the air bag status indicates that the air bag has been deployed.

In addition to the sensor, the detection component 42 includes a connector for sending signals to the mobile unit components it is connected to. Since the detection component 42 is connected to the processor 44 and is therefore able to receive signals from the processor 44, the processor 44 is able to actively change certain settings in the mobile unit components through the detection component 42.

The reference value(s) used in the third embodiment may be programmed in permanently or adjusted/provided by the stationary unit 34. The manner in which the stationary unit 34 uses commands to set or adjust the parameter values is described below.

The memory 46 of the mobile unit 32 maintains a record of all the measured and calculated data for a predefined amount of time, e.g. a month. FIG. 8 below provides an exemplary table format that may be used to store the data. A user accesses the data at the stationary unit 34, either by sending an e-mail command and waiting for a responsive status report, or by receiving the automatic status reports. Optionally, the mobile unit 32 may include a connection jack through which a user interface may be connected. If a user interface (e.g., a laptop computer) is connected to the mobile unit 32, the data in the memory 46 may be viewed, heard, downloaded, or otherwise accessed by a user through the connected user interface.

The stationary unit 34 includes a memory 62, a processing unit 64, and some type of user interface 66. The user interface 66 typically includes an output device such as a monitor (GUI) and a speaker, combined with some type of well-known input device such as a keyboard or a mouse. The stationary unit 34 may include a backend processing unit 64 that performs limited processing functions such as report combination, command generation, and database management, as described below.

As will be described in more detail below, some embodiments of the automatic messaging system 30 allow a two-way communication between the mobile unit 32 and the stationary unit 34. While the mobile unit 32 is capable of sending status reports automatically, the stationary unit 34 may generate and transmit e-mails in any way that best suits the need of the stationary unit 34. If desired, the stationary unit 34 may also be programmed to operate in an automatic mode. However, the stationary unit 34 may operate in a manual mode whereby status reports are generated only in response to inputs from the operator. Alternatively, the stationary unit 34 may operate in a combination mode, generating manually requested e-mails as well as automatic e-mails.

While the messages generated by the mobile unit 32 contain status reports, the messages generated by the stationary unit 34 contain commands. The commands may be embedded in the body of the message or in transmitted as an attachment. Commands may be used to trigger the recipient mobile unit to reconfigure its status reports, for example to include different data or change the timing of the status report generations and transmissions. If the stationary unit 34 sends a message with a command to "check ambient temperature," the processor 44, upon receiving the command, will parse the command and send a signal to the proper detection components 42. Additionally, the command can be used to set or adjust reference values, such as a reference speed value that triggers status report transmission. If the operator wants to be notified of mobile units moving at a speed greater than 70 mph instead of speed greater than 80 mph, s/he can send a command setting the reference speed to 70 mph.

Usually, a command is addressed to a specific mobile unit and triggers an action on the part of the target mobile unit. However, some embodiments allow the stationary unit to "broadcast" a command to all mobile units in the system. Using the e-mail format, this broadcast function may be implemented by setting up a distribution group, addressing the command to multiple mobile units, or using the "copy" function.

Figure 3:
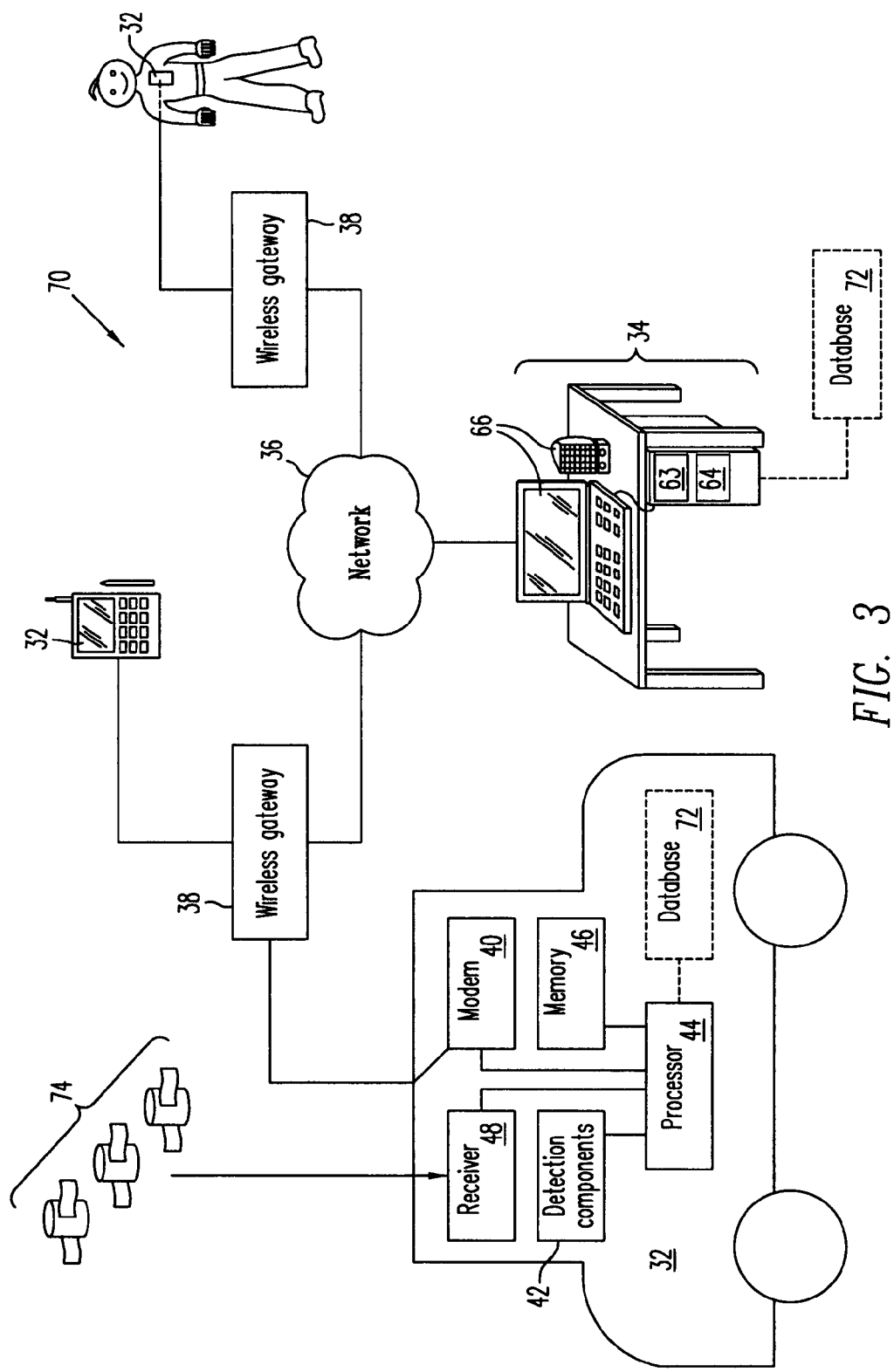
FIG. 3 depicts an automatic location messaging system in accordance with the invention.

FIG. 3 depicts an automatic location messaging system 70, which is substantially similar to the automatic messaging system 30 except that the mobile unit 32 includes a GPS receiver 48 for receiving positioning data from a GPS satellite system 74. The processor 44 uses the received positioning data to determine the position of the mobile unit 32. The position of the mobile unit 32 may be determined using any of the well known methods.

As in the automatic messaging system 30, the mobile unit 32 of the automatic location messaging system 70 may send status reports at a regular time interval (e.g., every three minutes) or when a predefined condition is fulfilled. Since position information is available in the automatic location messaging system 70, position-based conditions can be used, unlike in the automatic messaging system 30. For example, an alert signal may be added to the status report if the mobile unit 32 goes out of an area that it should stay in (e.g., state border). Also, availability of the position information leads availability of various other parameters that may be derived from the position information, such as an average speed and acceleration. While speed measurements taken by the detection component 42 measures the speed at the time of measurement, speed calculated from position data provides an estimated average speed. The average speed is determined by using the formula $(position_1 - position_2)/(time_1 - time_2)$. Once the average speed is calculated, acceleration may be calculated using the formula $(speed_1 - speed_2)/(time_1 - time_2)$. Preferably, each status report is time-stamped. Thus, in the automatic location messaging system 70, conditions such as "an average speed greater than 80 mph" may be used to affect the manner of status report generation.

FIG. 3 shows a database 72 in the mobile unit 32 and the stationary unit 34. The database 72, which may be incorporated into the mobile unit 32, the stationary unit 34, or both, store what is herein referred to as "peripheral data." Peripheral data includes any data that is independent of a measurement by the detection component 42 or positioning data received by the receiver 48, such as a map, speed limits, traffic light locations, and landmarks. As will be explained below, the database 72 can be updated and edited. For example, if the driver of the mobile unit 32 notices a change in the speed limit or a landmark that should be added to the map database, the mobile unit 32 may update the database 72 to reflect the change. The operator at the stationary unit 34 may update the database 72 as well. If the database 72 is in the mobile unit 32, the stationary unit 34 would update it by sending a command as described above.

Figure 4:
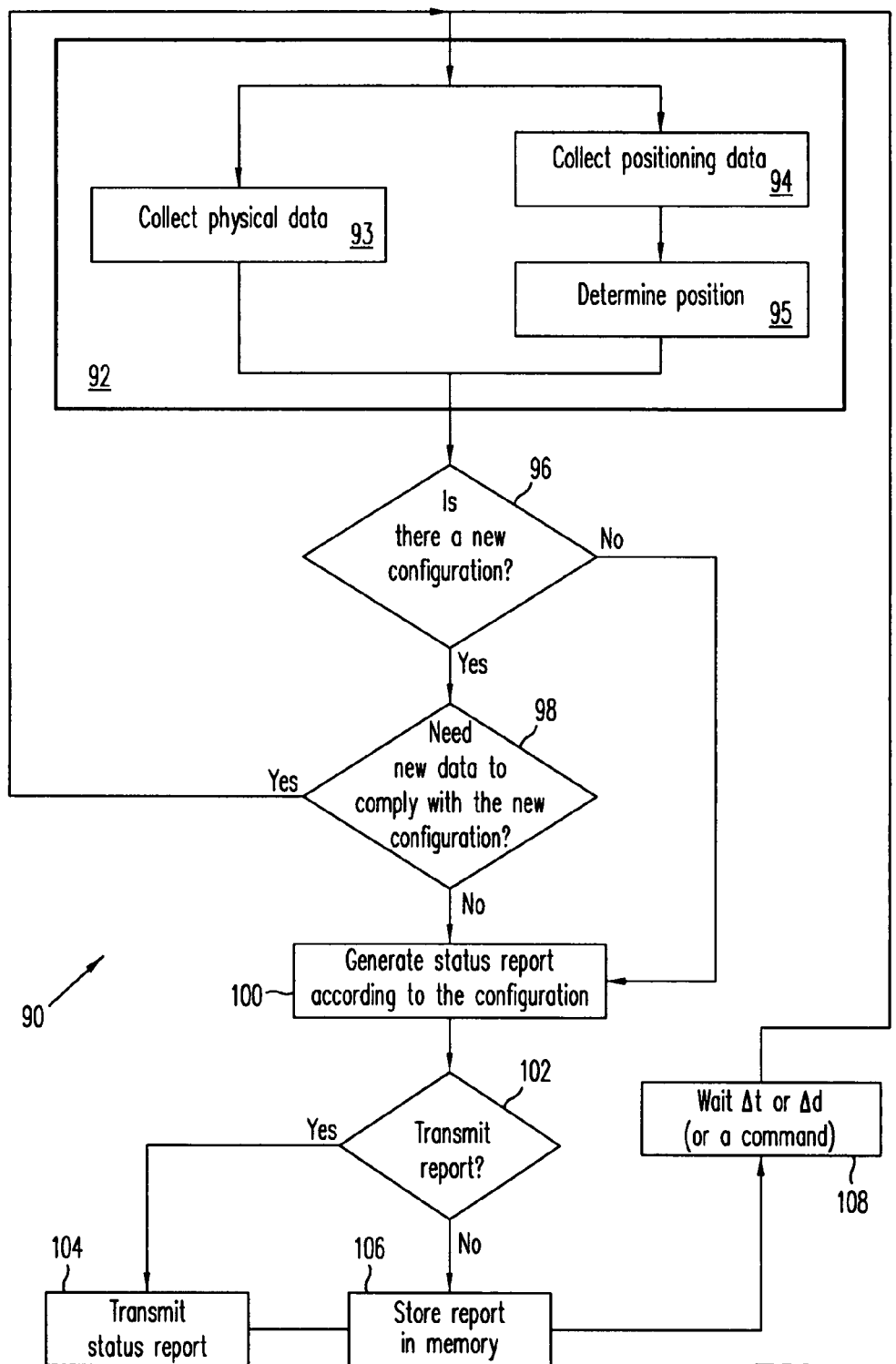
FIG. 4 is a flowchart depicting an automatic e-mail generation process executed by the mobile unit.

FIG. 4 is a flowchart depicting an automatic e-mail generation process 90 executed by the mobile unit 32, whereby a status report is transmitted at a regular time interval (Δt) or distance interval (Δd). In addition, optionally, the e-mail may be generated manually, in response to a command. The automatic e-mail generation process 90 begins with a data collection step 92. The data collection step 92 includes collection of physical data by the detection components 42 (step 93) and/or collection of positioning data by the receiver 48 (step 94). If positioning data is collected in step 94, the positioning data is used to derive the position of the mobile unit 32 (step 95). After the data collection step 92 but before the generation of a status report, the processor 44 checks to see if any command has been received to reconfigure the status report generation (step 96). If such command has been received, the processor 44 checks to see if any new data needs to be collected to comply with the new configuration (step 98). If new data is needed, the new data is obtained by looping back to the data collection step 92. On the other hand, if either there is no new configuration command or there is a configuration command but it does not require more data collection, the status report is generated according to the configuration (step 100). As described above, some mobile units transmit every status report that is generated, while other mobile units selectively transmit the generated status reports. If the status report is to be transmitted (step 102), the mobile unit 32 transmits the status report (step 104) and also stores it in the memory 46 (step 106). If this particular status report does not need to be transmitted, the mobile unit 32 stores the status report without transmitting it. After waiting (step 108) for a predefined time interval Δt, distance interval Δd, or a command, the automatic e-mail generation process 90 is repeated.

The status reports may be generated in any well-known formats including but not limited to human-readable format such as text and HTML and standard application formats such as Microsoft Excel® or Outlook®. Optionally, for security purposes, the status reports may be encrypted prior to transmission using any of the known encryption methods.

Figure 5:
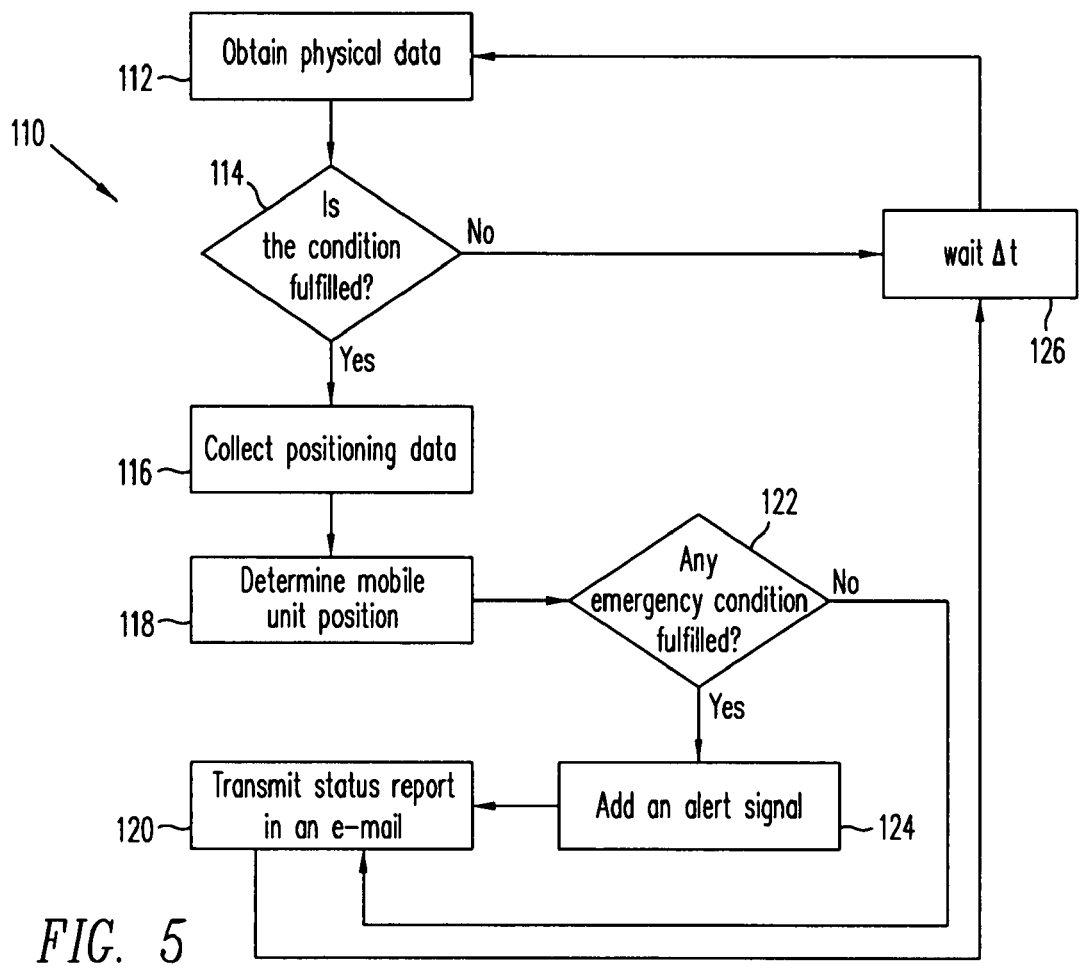
FIG. 5 is a flowchart depicting an alternative automatic e-mail generation process that is executed by the mobile unit.

FIG. 5 is a flowchart depicting an alternative automatic e-mail generation process 110 that is executed by the mobile unit 32, whereby a status report is transmitted only if a predefined condition is fulfilled. The alternative automatic e-mail generation process 110 begins with the detection component's obtaining of physical data (step 112) in response to a prompt by the processor 44. Using the physical data that is obtained, the mobile unit 32 checks to see if a predefined condition for transmitting position information is fulfilled (step 114). The predefined condition may be, for example, a measured speed that exceeds a reference value, such as 80 mph. If the condition is fulfilled, the processor 44 prompts the receiver 48 to collect positioning data from the GPS satellites 74 (step 116) and derive the mobile unit position (step 118), for example by triangulation. The mobile unit position and the physical data are then incorporated into a status report, encapsulated in an e-mail, and transmitted to the stationary unit 34 (step 120). In the embodiment shown, the processor 44 checks the measured and calculated values against a list of emergency conditions and adds an emergency alert to the status report if any of the emergency conditions are fulfilled. The list of emergency conditions, for example, may include a speed level that is considered to pose a serious danger (e.g., average speed>100 mph), or indicate a high likelihood of an accident, such as a deployed air bag, an abnormal acceleration pattern, or a position that is in an area marked as water. Thus, after determining the mobile unit position in step 118, at which point all the raw data for a status report has become available, the processor 44 checks to see if any of the emergency conditions are fulfilled (step 122). If any of the emergency conditions is fulfilled, an alert is added to the status report to make sure the operator is notified (step 124). If no emergency condition is fulfilled, no alert is added and the e-mail is transmitted without the alert. After a certain amount of time (step 126), the alternative automatic e-mail generation process 112 is repeated. The processes depicted in FIG. 4 and FIG. 5 may be implemented in the form of any well-known computer-readable instructions or codes deemed suitable by a person skilled in the art.

Figure 6:
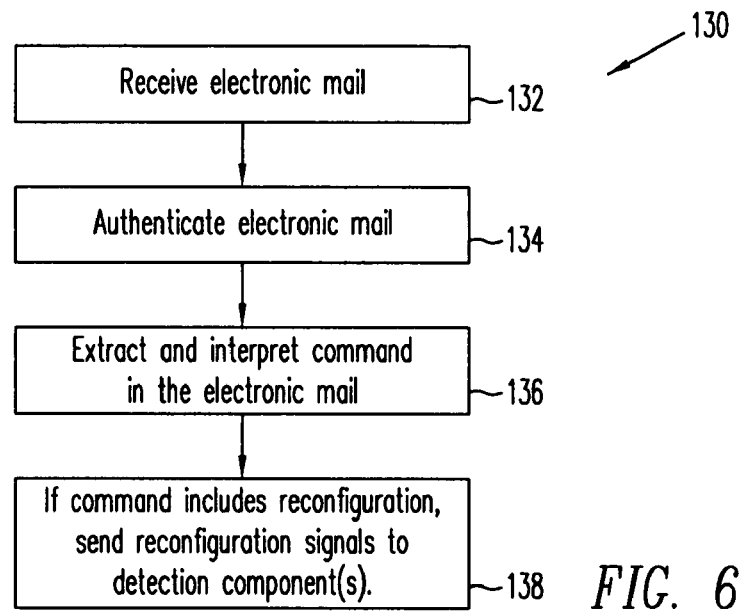
FIG. 6 is a flowchart depicting a remote reconfiguration process.

FIG. 6 is a flowchart depicting a remote reconfiguration process 130 that may be executed by the automatic messaging system 30 or the automatic location messaging system 70. As mentioned above, the mobile unit 32 includes detection components 42 that are controlled by the processor 44. Since the processor 44 is capable of receiving commands from a remote source, such as the stationary unit 34, the remote source is able reconfigure the mobile unit 32 by transmitting electronic mails containing commands.

In the remote reconfiguration process 130, the mobile unit 32 receives an electronic mail from the stationary unit 34 (step 132). The processor 44 authenticates the received electronic mail, for example by using a password or verification of electronic signature (step 134). Once authentication is positive and complete, the processor 44 extracts the command in the electronic mail and interprets it (step 136). If the command includes a reconfiguration request, the processor 44 sends appropriate signals to one or more of the mobile unit components (step 138). For example, if the reconfiguration request is to change a speed reference value from 80 mph to 70 mph, the processor will send a command to the memory 46 to reset the reference value. If the reconfiguration request is to change the door status to "lock" or to honk the horn three times, appropriate signals will be sent to the detection components 42 to execute the command. The detection components 42 not only detect physical parameters from various parts of the mobile unit 32 but also detect signals from processors and execute the signals through the mobile unit parts that they are connected to. Thus, the detection components 42 allow the stationary unit 34 to actively drive certain parts of the mobile unit 32 from a remote location, and to obtain information about specific mobile unit components from a remote location.

Figure 7:
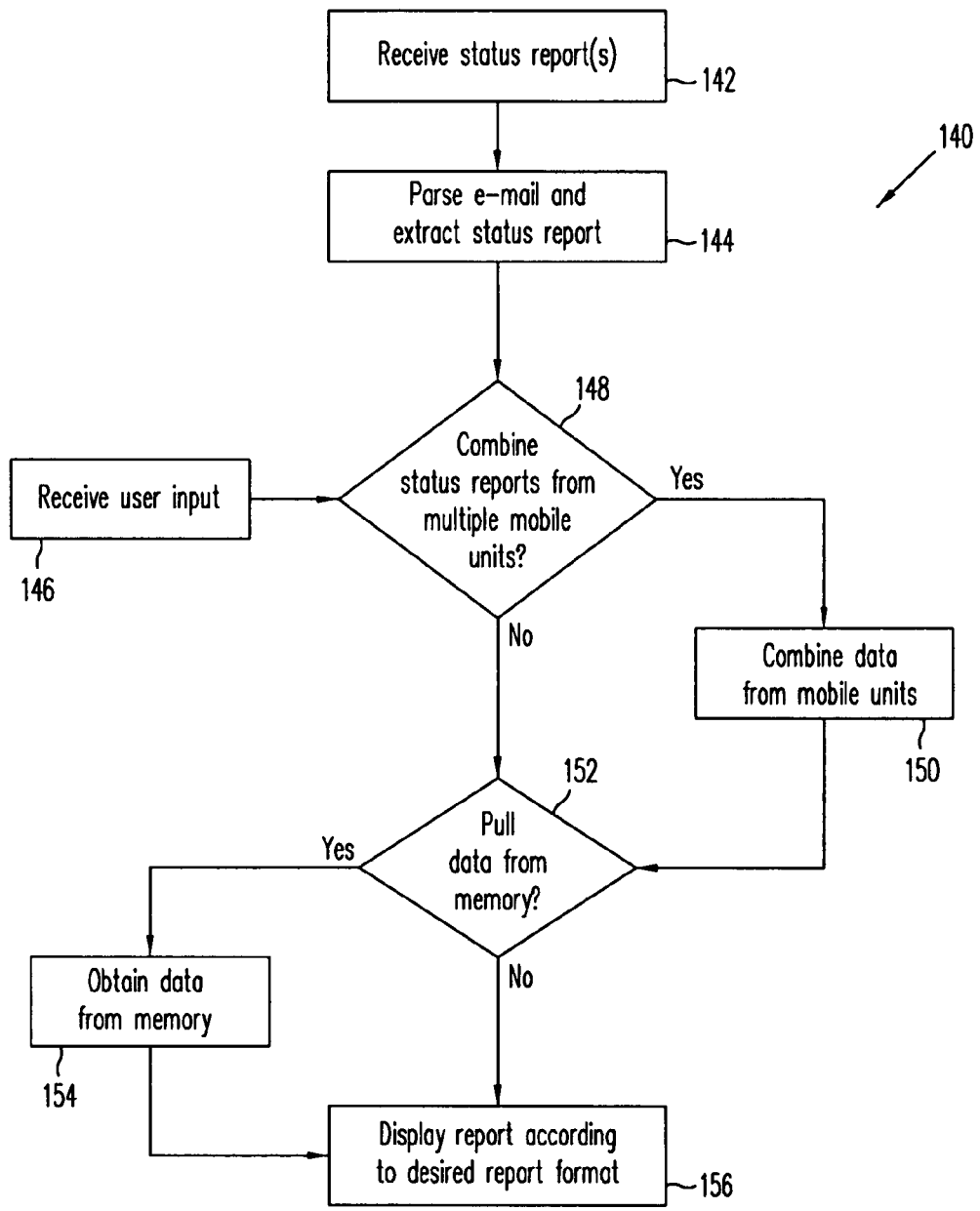
FIG. 7 is a flowchart depicting a report displaying process that is executed by the stationary unit.

FIG. 7 is a flowchart depicting a report displaying process 140 that is executed by the stationary unit 34. When the stationary unit 34 receives an e-mail status report from at least one mobile unit 32 (step 142), it parses the e-mail and extracts the status report (step 144). The stationary unit 34 also receives input from the operator (step 146). If the status report is encrypted, a decryption operation may be performed. Optionally, in embodiments where the stationary unit 34 includes the backend processing unit 64 described above, the reports received from multiple mobile units 32 may be combined to generate a comprehensive report. Thus, the processor 44 checks to see if the user input received in step 146 requests consolidation of the multiple status reports (step 148). If the user input instructs to combine the reports, the stationary unit 34 combines the reports to generate a report that complies with the requested formatting parameters (step 150).

The system of the invention allows the operator at the stationary unit 34 to customize the report format. Thus, using the user interface 86, the operator is able to select the information she is interested in receiving and a particular arrangement for the information. For example, the operator may choose to see information regarding a particular mobile unit for the past week. Alternatively, the operator may want to see current information about all the mobile units in a particular geographical zone in the coverage area. Depending on the report format that is chosen by the operator, more data may need to get pulled, for example from the memory 46. For example, if not all the status reports from the mobile units are synchronized, status reports from the mobile units will be received at different times. In this case, if the operator requests to see the status of multiple mobile units, the most recently received data for some of the mobile units will be pulled from the memory and combined with the status report that was just received at the beginning of the report displaying process 140. Furthermore, if the report format requested by the user requires any peripheral data, the appropriate peripheral data is pulled from the database 72 so they can be incorporated into the report. In step 150, the processor determines whether to pull data from the memory 46 and/or the database 72, and pulls the data as needed (step 154). Once all the necessary data is obtained and a report is prepared in the user-specified format, the report is presented to the operator through the user interface 66 (step 156).

FIG. 8 depicts an exemplary status report 160 generated by the mobile unit 32 and e-mailed to the stationary unit 34 to be viewed by the operator. The table-format report 160 includes a mobile unit identity 162, a current position 164, a current time 166, average speed 168, acceleration 170, a temperature 172, and air bag status 174. If the operator wishes to change the format of the report 160, for example by adding a column for door status, he will send an e-mail to the mobile unit 32 with a command to reconfigure the report accordingly. The mobile unit 32, upon receiving this command to reconfigure the report, will obtain the door status measurement and prepare a new report, for example according to the automatic report generation process 90 (see FIG. 4).

FIG. 9 depicts an exemplary multiple mobile unit report 180 generated by the stationary unit 34 in the step 150 of the report displaying process 140 (see FIG. 7). To generate the multiple mobile unit report 180, the processor 44 in each of the multiple mobile units 32 sends its respective report to the stationary unit 34, which then combines the report content into one report and formats it according to user specifications, as shown in FIG. 7. The formatting process may entail pulling stored information, as described above in reference to FIG. 7.

Figure 10:
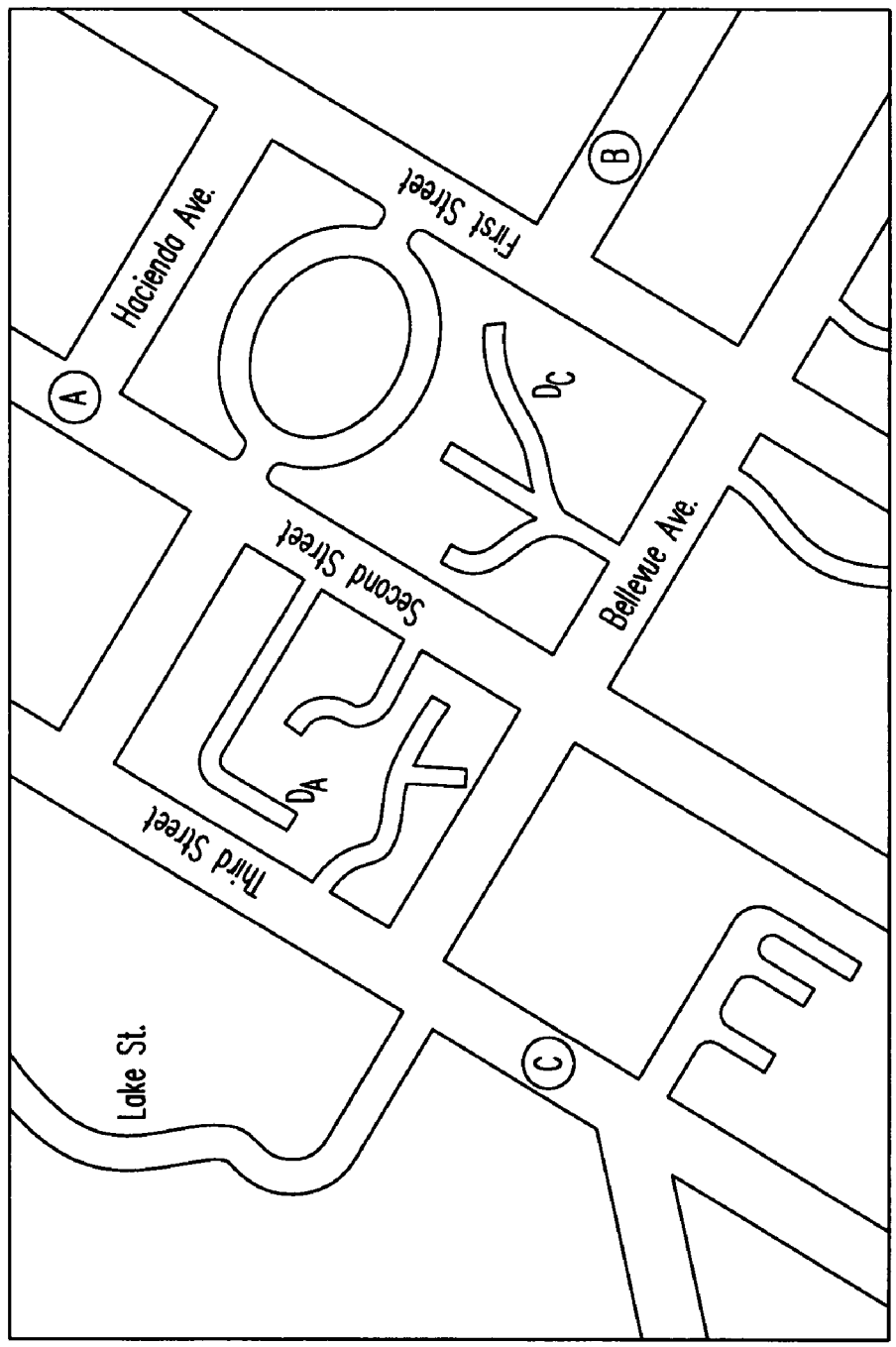
FIG. 10 depicts a graphical multiple mobile unit report generated by the stationary unit.

FIG. 10 depicts a graphical multiple mobile unit report 190 generated by the stationary unit 34, which shows the relevant mobile units superimposed on a map pulled from the database 72. The graphical report 190 shows Mobile Unit A, Mobile Unit B, and Mobile Unit C, as well as some of their destinations ($D_A$ and $D_C$ for Mobile Units A and C, respectively). The destination of Mobile Unit B may be not shown because it is located off the portion of the map that is shown. In the graphical report 190, Mobile Unit A is shown marked with a star (*) to indicate that it is moving abnormally slow. The operator viewing the report can then call the customer at Mobile Unit A's destination to inform the customer that the delivery will be a little late due to unforeseen traffic conditions.

The mobile unit 32 and the stationary unit 34 may exchange e-mail messages not only to modify or enhance the status report and ultimately the report viewed by the user, but also to modify the content of the database 72. For example, landmarks may be added to reports, deleted from the list of landmarks in the database 72, or otherwise modified through e-mail exchanges. Numerous embodiments are possible for modifying the database 72. In a first embodiment, the stationary unit 34 sends a command to the mobile unit 32 to add the mobile unit's current location to the list of landmarks in the database 72. In response, the mobile unit 32 may add its current location to the list of landmarks it maintains in the database 72, which in this case is located in the mobile unit 32. The newly added landmark is now available to be incorporated into a future status report or to be used as a parameter for alert generation. After the addition is complete, the stationary unit 34 sends another command to disable the mobile unit's ability to add landmarks. This way, the database is controlled through the stationary unit 34 but maintained in each individual mobile unit 32.

In a second embodiment, the stationary unit 34 sends a specific landmark to the mobile unit 32 along with a command to add the attached landmark to the list of landmarks in the database 72 located in the mobile unit 32. The stationary unit 34 may use this command, for example, when it has received the specific landmarks from other mobile units and wants to keep all the mobile unit databases consistent.

A third embodiment for modifying the database 72 utilizes a user interface device at the mobile unit 32. As mentioned above, a user interface device may be connected to the mobile unit 32, for example through an electrical jack. When the user interface device is connected to the mobile unit 32, the driver of the mobile unit 32 may initiate modification of the landmark list in the database 72. If the database 72 is located in the mobile unit 32, a direct input through the user interface device accomplishes the modification. If the database 72 is located at the stationary unit 34, however, a status report would be manually generated to tell the stationary unit 34 to modify the landmark list in a certain way. The status report may tell the stationary unit 34 to add a particular landmark to the database 72. Alternatively, the status report may tell the stationary unit 34 to add the mobile unit's current position as a landmark. The user interface device may be as complex as a laptop computer or as simple as a button. A person of ordinary skill in the art will understand how to implement this database modification feature.

Using the automatic messaging system 30, a stationary unit 34 can obtain information about its mobile units 32, such as when a driver of the mobile unit is speeding or if the mobile unit 32 is involved in an accident. Furthermore, if there is an unsafe condition that the driver of the mobile unit 32 may not be aware of, such as a door that is not closed properly or a seatbelt that is not used, the operator at the stationary unit 34 will be able to contact the mobile unit 32 to tell the driver to properly close the door or use the seatbelt. In addition, the automatic messaging system 30 may be used by the stationary unit 44 to receive periodic updates on the status of its mobile units in a cost-effective manner.

The invention has been described using variations and examples to enable one skilled in the art to develop an understanding of the invention. Numerous variations may be implemented within the spirit and scope of the invention. For example, the stationary unit 34 may not be literally "stationary." A positioning method other than the GPS satellite method may be used. The memory 46 and the database 72 may be implemented as one storage unit. As such, one skilled in the art should reference the claims of the invention rather than the foregoing examples to assess rights entitled to with respect to the claims.

What is claimed is:

1. A communication system comprising:
   a user interface unit that is configured to generate a configuration command for controlling a mobile unit and transmit the configuration command in an electronic mail,
   wherein the mobile unit is configured to remotely receive the electronic mail, extract the configuration command from the electronic mail, collect data about physical status of the mobile unit in accordance with the command, automatically generate a report according to the command using the data about the physical status, format the report according to an electronic mail protocol, and transmit the report to the user interface unit.

2. The system of claim 1, wherein the report is transmitted from the mobile unit to the user interface unit according to one of SMTP, POP, IMAP, MIME, RFC-822, and Instant Messaging (IM) protocols.

3. The system of claim 1, wherein the mobile unit further comprises a detection component coupled to the processor, wherein the detection component comprises a sensor for measuring a physical parameter.

4. The system of claim 1, wherein the mobile unit further comprises a means for determining a position of the mobile unit.

5. The system of claim 1, wherein the mobile unit further comprises a receiver for receiving positioning data from satellites, allowing the processor to use the positioning data for determining a position of the mobile unit.

6. The system of claim 1, wherein the memory stores the report for a predefined length of time after the report is transmitted to the user interface unit.

7. The system of claim 1 further comprising a plurality of mobile units including the mobile unit, wherein the user interface unit is connected to a backend processing unit for combining reports generated by the plurality of mobile units.

8. The system of claim 1, wherein the user interface unit comprises an input device for receiving information from a user and an output device for presenting information to a user.

9. The system of claim 1, wherein the report format is changeable through the user interface unit.

10. The system of claim 1, wherein the mobile unit reconfigures the report according to the configuration command received from the user interface unit.

11. The system of claim 1 further comprising a database for manually entered peripheral data, wherein the peripheral data is used for compliance with the report format.

12. The system of claim 11, wherein the peripheral data comprise at least one of landmarks, maps, speed limits, and traffic light locations for the mobile unit to use as a positional reference in the report, wherein the positional reference indicates a position of the mobile unit.

13. The system of claim 11, wherein the mobile unit adds landmarks to the database for use in the report.

14. The system of claim 1, wherein the user interface unit transmits one or more landmarks to the mobile unit for use as a positional reference in the report.

15. A mobile communication device comprising:
a detection component for measuring a physical status;
a processor connected to the detection component, wherein the processor is configured to remotely receive an electronic mail, extract a configuration command from the electronic mail, generate a report according to the configuration command and incorporate the physical status into the report; and
a wireless modem connected to the processor, wherein the wireless modem is configured to transmit the report according to predetermined electronic mail protocol once the physical status fulfills a condition.

16. The device of claim 15, wherein the predetermined electronic mail protocol is one of SMTP, POP, IMAP, MIME, RFC-822, and Instant Messaging (IM) protocols.

17. The device of claim 15 further comprising a receiver for receiving positioning information, wherein the processor uses the positioning information to determine a location of the mobile communication device.

18. The device of claim 17 further comprising a database for storing maps, traffic light locations, and landmarks for use as a positional reference in the location of the mobile communication device.

19. The device of claim 15, wherein the condition is one of:
a passage of predetermined amount of time since a previous transmission;
a predefined relationship between the physical parameter and a reference value;
a minimum distance traveled since a previous transmission; and
a command from an external source to transmit the report.

20. A method of communication comprising:
obtaining data about physical status of a mobile unit;
remotely receiving an electronic mail and extracting a configuration command for configuring a report from the electronic mail;
automatically preparing, via the mobile unit, the report in accordance with the configuration command, wherein the report incorporates the data; and
transmitting the report using one of SMTP, POP, IMAP, MIME, RFC-822, and Instant Messaging (IM) protocols if the data satisfies a predefined condition, without receiving an external command to transmit.

21. The method of claim 20 further comprising determining whether the data fulfills a predefined condition by comparing the data against a reference value.

22. The method of claim 20, wherein the data is at least one of position information, calculated information, physical parameters, and environmental parameters.

23. The method of claim 20 further comprising time-stamping the report.

24. The method of claim 20 further comprising storing the report for a predetermined period of time.

25. The method of claim 20 further comprising counting a length of distance traveled or time passed since a previous transmission to determine if the data satisfies the predefined condition.

26. The method of claim 20 further comprising:
comparing the data against an emergency condition; and
transmitting an alert signal if the data satisfies the emergency condition.

27. The method of claim 20 further comprising:
receiving an enabling command for adding new data to a database; and
adding new data to the database before receiving a disabling command for disabling addition of new data to the database.

28. The method of claim 20 further comprising preparing the report in a human-readable format such that no format conversion is necessary before the report is presented to a viewer.

29. The method of claim 28, wherein the human-readable format is one of HTML and text format.

30. The method of claim 20 further comprising preparing the report in a standard application format.

31. The method of claim 20 further comprising encrypting the report prior to transmission.

32. The method of claim 20 further comprising:
receiving a message in one of SMTP, POP, IMAP, MIME, RFC-822, and Instant Messaging (IM) protocols; and
authenticating the received message.

33. A mobile device for communication via a wireless network, comprising:
means for obtaining physical data and positioning data;
means for remotely receiving an electronic mail and extracting a configuration command from the electronic mail;
means for preparing a report using the physical data and the positioning data, wherein the report includes data requested in the configuration command; and
means for transmitting the report in an electronic mail format without receiving an external command to transmit.

34. A non-transitory computer-readable medium having computer-executable instructions for communicating via a wireless network wherein the instructions, upon execution, perform a process that comprises:
obtaining physical data and positioning data;
remotely receiving an electronic mail and extracting a configuration command from the electronic mail;
preparing a report using the physical data and the positioning data, wherein the report includes data requested in the configuration command; and transmitting the report in an electronic mail format without receiving an external command.

* * * * *